M. HOLDER.
Hay-Rake Machine.
No. 214,139. Patented April 8, 1879.
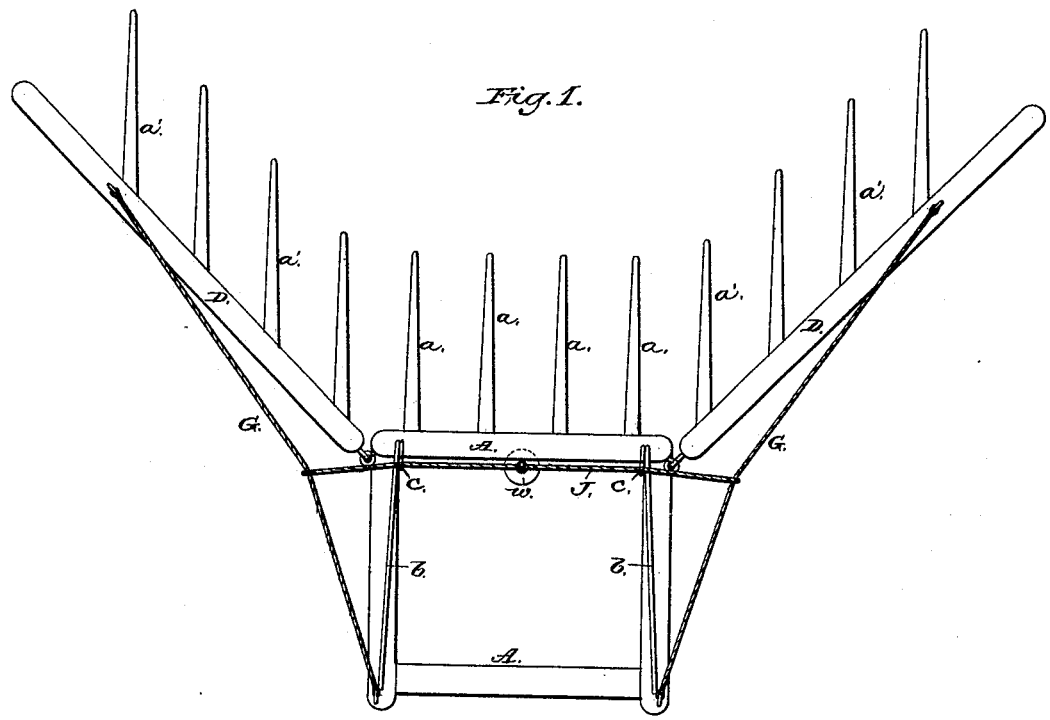
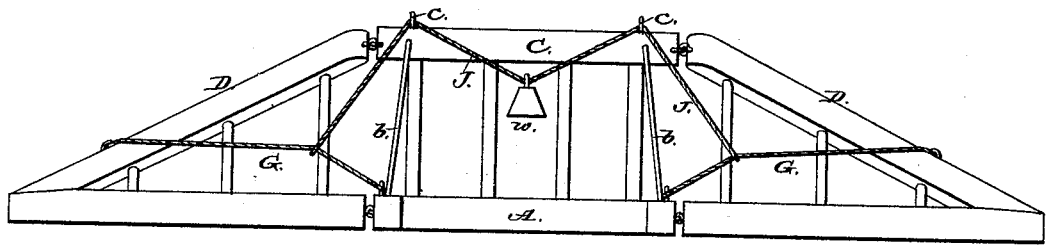
WITNESSES
John A. ...
A. H. Gawler,
INVENTOR
Marion Holder,
by E. W. Anderson,
ATTORNEY

UNITED STATES PATENT OFFICE.

MARION HOLDER, OF HAWESVILLE, KENTUCKY.

IMPROVEMENT IN HAY-RAKE MACHINES.

Specification forming part of Letters Patent No. 214,139, dated April 8, 1879; application filed February 1, 1879.

*To all whom it may concern:*

Be it known that I, MARION HOLDER, of Hawesville, in the county of Hancock and State of Kentucky, have invented a new and valuable Improvement in Hay-Rake Machines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of this invention. Fig. 2 is a rear view of the same.

This invention has relation to improvements in hay raking and gathering machines; and the nature of the invention consists in combining with a rectangular drag, moving on the ground and provided with teeth on its front edge, lateral wings, hinged to said drag so as to vibrate horizontally, and also provided with rake-teeth, the said wings being guyed to the body or drag by means of ropes.

It also consists in combining with the drag, its swinging wings, and guys connecting the wings to the body of the drag, a rope extending through eyes or pulleys on the drag and connecting the guys together, and a weight suspended from said rope, as will be hereinafter more fully set forth.

In the annexed drawings, the letter A designates a rectangular frame strongly put together, and, if of wood, usually shod with metal. From the front edge of this frame project teeth $a$ in a horizontal direction, and upon its front edge is erected an open-work frame, C, which, as the drag moves forward, gathers the hay in a roll.

The frame C is braced to the drag by the metallic rods $b$, secured at one end to the top bar of the frame, and at the other to the rear part of the drag.

D indicates the wings of my improved hay-rake, the same being usually an open-work triangular frame, arranged vertically and hinged to vibrate horizontally to the front part of the drag.

Usually the frame or wings D will have hooks secured thereto, which engage eyes upon the fore part of the drag, as shown in Fig. 1.

The lower rails of the wings, which just clear the ground, are provided with projecting teeth $a'$.

When in working position, the wings form an obtuse angle relative to the front bar of the drag, and their teeth $a'$ are parallel to the teeth $a$, above described, being set in at an obtuse angle to the wings for this purpose.

The draft-animals are attached to the ends of the wings, and the latter are prevented from swinging to the front beyond the position shown in Fig. 1 by the guy-ropes G, secured to the wings at one end and to the drag at the other.

When the hay has been gathered by the forward movement of the rake in sufficient quantity, the animals are turned to the right and left, the teeth $a'$ drawn out of the hay, and after a short backward movement of the rake the teeth $a$ are likewise disengaged. The teeth being then behind and taking no hold, the machine may be drawn to any desired position and a new load gathered.

The ropes G are connected together by means of a rope, J, extending through eyes $c$ on the frame C, and provided with a weight, $w$, between said eyes.

When the wings D are swung back to drop their load the weight $w$ falls, thus drawing rope J through the eyes $c$ and taking up the slack of the guys. By this means the said guys are prevented from dragging on the ground and fouling the rake.

What I claim as new, and desire to secure by Letters Patent, is—

1. The combination, with a drag having projecting teeth $a$ on its front, of the lateral wings D, having teeth $a'$, and hinged to said drag, and the guy-ropes G, connecting the wings and drag, substantially as specified.

2. The combination, with the drag-rake A, the rake-wings D, hinged thereto, and the guy-ropes G, connecting the wings and drag, of a rope, J, connecting guys G, extending through eyes on the drag, and provided with a weight, $w$, substantially as specified.

In testimony that I claim the above I have hereunto subscribed my name in the presence of two witnesses.

MARION HOLDER.

Witnesses:
GEO. W. MCADAMS,
MURRY WILLIAMS.